(12) United States Patent
Stites (10) Patent No.: US 9,784,570 B2
(45) Date of Patent: Oct. 10, 2017

(54) POLARIZATION-BASED COHERENT GRADIENT SENSING SYSTEMS AND METHODS

(71) Applicant: Ultratech, Inc., San Jose, CA (US)

(72) Inventor: David G. Stites, St. Petersburg, FL (US)

(73) Assignee: Ultratech, Inc., San Jose, CA (US)

( * ) Notice: Subject to any disclaimer, the term of this patent is extended or adjusted under 35 U.S.C. 154(b) by 0 days.

(21) Appl. No.: 15/152,907

(22) Filed: May 12, 2016

(65) Prior Publication Data

US 2016/0363440 A1 Dec. 15, 2016

Related U.S. Application Data

(60) Provisional application No. 62/175,492, filed on Jun. 15, 2015.

(51) Int. Cl.
*G01B 9/02* (2006.01)
*G01B 11/24* (2006.01)

(52) U.S. Cl.
CPC ...... *G01B 11/2441* (2013.01); *G01B 9/02098* (2013.01); *G01B 2290/30* (2013.01); *G01B 2290/45* (2013.01); *G01B 2290/70* (2013.01)

(58) Field of Classification Search
CPC .............. G01B 9/02098; G01B 11/162; G01B 2290/70; G01J 9/0215; G01M 11/025
See application file for complete search history.

(56) References Cited

U.S. PATENT DOCUMENTS

| | | |
|---|---|---|
| 3,829,219 A | 8/1974 | Wyant |
| 4,534,649 A | 8/1985 | Downs |

(Continued)

FOREIGN PATENT DOCUMENTS

| | | |
|---|---|---|
| CN | 204008073 U | 12/2014 |
| JP | 2006049635 A | 2/2006 |

OTHER PUBLICATIONS

Rimmer et al., "Evaluation of large aberrations using a lateral-shear interferometer having variable shear," Appl. Opt., vol. 14, pp. 142-150, Jan. 1975.

(Continued)

*Primary Examiner* — Hwa Lee
(74) *Attorney, Agent, or Firm* — Downs Rachlin Martin PLLC (57) ABSTRACT

Polarization-based coherent gradient-sensing systems and methods for measuring at least one surface-shape property of a specularly reflective surface are disclosed. The method includes: reflecting a first circularly polarized laser beam from a sample surface to form a second circularly polarized laser beam that contains surface-shape information; converting the second circularly polarized laser beam to a linearly polarized reflected laser beam; directing respective first and second portions of the linearly polarized reflected laser beam to first and second relay assemblies that constitute first and second interferometer arms. The first and second relay assemblies each use a pair of axially spaced-apart gratings to generate respective first and second interference patterns at respective first and second image sensors. Respective first and second signals from the first and second image sensors are processed to determine the at least one surface-shape property.

24 Claims, 3 Drawing Sheets

(56) References Cited

U.S. PATENT DOCUMENTS

| | | | |
|---|---|---|---|
| 5,526,116 | A | 6/1996 | DeGroot |
| 5,572,323 | A | 11/1996 | Maeda et al. |
| 6,031,611 | A | 2/2000 | Rosakis et al. |
| 6,469,788 | B2 | 10/2002 | Boyd et al. |
| 6,741,356 | B1 | 5/2004 | Ishiwata et al. |
| 7,369,251 | B2 | 5/2008 | Rosakis et al. |
| 2002/0012122 | A1 | 1/2002 | Boyd et al. |
| 2007/0211256 | A1 | 9/2007 | Medower et al. |
| 2015/0146213 | A1* | 5/2015 | Rhee .................. G01J 9/0215 356/520 |

OTHER PUBLICATIONS

Schreiber et al., "Lateral shearing interferometer based on two Ronchi phase gratings in series," Appl. Opt., vol. 36, No. 22, Aug. 1, 1997, p. 5321-24.

Search Report dated Nov. 16, 2016 from the Intellectual Property Office of Singapore for Patent Application No. 10201604688S, which is a counterpart application to the above-identified U.S. Patent Application.

Written Opinion dated Apr. 13, 2017 from the Intellectual Property Office of Singapore for Patent Application No. 10201604688T, which is a counterpart application to the above-identified U.S. Patent Application.

\* cited by examiner

POLARIZATION-BASED COHERENT GRADIENT SENSING SYSTEMS AND METHODS

CROSS-REFERENCE TO RELATED APPLICATIONS

This application claims the benefit of priority under 35 USC 119(e) of U.S. Provisional Patent Application Ser. No. 62/175,492, filed on Jun. 15, 2015, and which is incorporated by reference herein.

FIELD

The present disclosure relates to optical interferometry, and in particular to coherent gradient sensing, and more particularly relates to polarization-based coherent gradient sensing systems and methods.

The entire disclosure of any publication or patent document mentioned herein is incorporated by reference, including U.S. Pat. Nos. 3,829,219 and 5,526,116 and 6,031,611, and the publications by M. P. Rimmer et al., "Evaluation of large aberrations using lateral-shear interferometer having a variable shear," App. Opt., Vol. 14, No. 1, pp. 142-150, Jan. 1975, and by Schreiber et al., "Lateral shearing interferometer based on two Ronchi phase gratings in series," App. Opt., Vol. 36, No. 22, pp. 5321-5324, August 1997.

BACKGROUND

Coherent gradient sensing (CGS) is an interferometric technique used to measure one or more shape-based properties (e.g., height, slope and curvature) of a surface. The CGS techniques utilize a collimated coherent optical beam as an optical probe to obtain shape information indicative of a specularly reflective surface formed of essentially any material. When the specularly reflective surface is not flat, the wavefront of the reflected probe beam is distorted and thereby the reflected probe beam acquires an optical path difference or phase change associated with the shape of the surface under measurement.

Two gratings spaced relative to each other are placed in the path of the reflected probe beam to manipulate the distorted wavefront for measurement. A first grating diffracts the reflected probe beam to spatially separate diffraction components of different orders. A second grating further diffracts each diffraction component produced by the first grating. An optical element (e.g., a lens) positioned relative to the second grating combines two selected diffraction components produced by the second grating by diffracting two different diffraction components produced by the first grating. The two selected diffraction components interfere with each other to produce an interference pattern. The diffraction by the two gratings effects a relative spatial displacement between the two selected diffraction components, referred to as the shearing distance. The interference patterns contain information that allows extraction of the discrete height differences between two locations on the reflective surface that are separated by the shearing distance. These height differences can be interpreted as local surface gradient, which in turn, can be further processed to obtain topography information through numerical integration or curvature information through numerical differentiation.

Despite the success of existing CGS systems, there is an increasing demand for CGS systems to provide improved measurements of a sample surface, including less measurement noise and greater resolution, in order to provide greater measurement functionality over a wider range of measurement applications.

SUMMARY

An aspect of the disclosure is a method of measuring at least one shape-based property of a specularly reflective surface. The method includes: directing a collimated laser beam having a first circular polarization to a sample surface; reflecting the collimated laser beam from the sample surface to form a reflected laser beam having a second circular polarization and that includes shape information of the specularly reflective surface; converting the reflected laser beam having the second circular polarization to a linearly polarized reflected laser beam; directing a first portion of the linearly polarized reflected laser beam to a first pair of axially spaced apart gratings having a first orientation and forming two first diffraction components, and combining the two first diffraction components to form a first interference pattern on a first image sensor; directing a second portion of the linearly polarized reflected laser beam to a second pair of axially spaced apart gratings having a second orientation orthogonal to the first orientation and forming two second diffraction components and combining the two second diffraction components to form a second interference pattern on a second image sensor; and processing the first and second interference patterns to determine the at least one shape-based property of the specularly reflective surface.

Another aspect of the disclosure is the method as described above, wherein directing the first and second portions of the linearly polarized reflected laser beam includes using a beam splitter to send the first and second portions of the linearly polarized reflected laser beam to respective first and second relay assemblies.

Another aspect of the disclosure is the method as described above, wherein the first and second portions of the linearly polarized reflected laser beam have substantially the same intensity.

Another aspect of the disclosure is the method as described above, wherein directing the collimated laser beam includes generating an initial laser beam from a laser source and passing the initial laser beam through a first beam expander to form a first expanded laser beam and then through a beam expanding optical system to form a second expanded laser beam.

Another aspect of the disclosure is the method as described above, wherein the initial laser beam and the first expanded laser beam are linearly polarized and including passing the first expanded laser beam through a quarter-wave retardation plate to form a circularly polarized collimated laser beam.

Another aspect of the disclosure is the method as described above, wherein converting the reflected laser beam having the second circular polarization to the linearly polarized reflected laser beam includes passing the reflected laser beam through the quarter-wave retardation plate.

Another aspect of the disclosure is the method as described above, wherein combining the two first diffraction components includes passing the two first diffraction components through a first Fourier aperture using a first relay lens system, and wherein combining the two second diffraction components includes passing the two second diffraction components through a second Fourier aperture using a second relay lens system.

Another aspect of the disclosure is the method as described above, wherein the collimated laser beam having a first circular polarization has a diameter of between 300 mm and 450 mm.

Another aspect of the disclosure is the method as described above, wherein the collimated laser beam is formed from an initial laser beam emitted by a helium-neon laser.

Another aspect of the disclosure is the method as described above, wherein the first and second pairs of axially spaced apart gratings each consist of phase gratings.

Another aspect of the disclosure is the method as described above, further including controlling a first magnification of the first portion of the linearly polarized reflected laser beam and controlling a second magnification of the second portion of the linearly polarized reflected laser beam so that the first interference pattern formed on the first image sensor has a same size as the second interference pattern formed on the second image sensor.

Another aspect of the disclosure is the method as described above, where the first image sensor has first pixels and is combined with first camera lens to form a first camera, wherein the second image sensor has second pixels and is combined with a second camera lens to form a second camera, and wherein each of the first and second cameras has multi-axis position control to perform surface-to-sensor pixel matching between the sample surface and the first and second pixels of the first and second image sensors.

Another aspect of the disclosure is the method as described above, wherein the at least one shape-based property includes a height difference between two locations on the sample surface, a slope and a curvature.

Another aspect of the disclosure is the method as described above, and further including: directing the two first diffraction components through a first adjustable aperture having an adjustable size and adjustable axial position; directing the two second diffraction components through a second adjustable aperture having an adjustable size and adjustable axial position; and adjusting at least one of the size and axial position of the first and second adjustable apertures to block diffraction orders other than two first diffraction orders and two second diffraction orders, respectively.

Another aspect of the disclosure is a system for measuring at least one shape-based property of a sample having a surface that is specularly reflective. The system includes: a laser source that emits a first linearly polarized laser beam; a polarizing beam splitter arranged to transmit the first linearly polarized laser beam; a waveplate arranged to transmit the first linearly polarized laser beam transmitted by the polarizing beam splitter to form a first circularly polarized laser beam; a beam expanding optical system that receives and directs the first circularly polarized laser beam to the surface of sample to form a reflected laser beam having a second circular polarization and that includes shape information about the surface of sample, wherein the reflected laser beam exits the beam expanding optical system, passes through the waveplate and that reflects from the polarizing beam splitter to form a second linearly polarized laser beam; a beam splitter arranged to pass and reflect respective first and second portions of the second linearly polarized laser beam; a first relay assembly arranged to receive and direct the first portion of the second linearly polarized laser beam to a first pair of axially spaced apart gratings having a first orientation and that form two first diffraction components, wherein the two first diffraction components are combined to form a first interference pattern on a first image sensor; a second relay assembly arranged to receive and direct the second portion of the second linearly polarized laser beam to a second pair of axially spaced apart gratings having a second orientation to form two second diffraction components, wherein the two second diffraction components are combined to form a second interference pattern on a second image sensor; and a processor configured to process the first and second interference patterns to determine the at least one shape-based property of the sample having the surface that is specularly reflective.

Another aspect of the disclosure is the system as described above, wherein the at least one shape-based property includes a height difference between two locations on the surface of sample, a slope and a curvature.

Another aspect of the disclosure is the system as described above, wherein the surface of sample has a diameter and wherein the beam-expanding optical system is configured to expand the first circularly polarized laser beam to have a diameter equal to or greater than the diameter of the surface of sample.

Another aspect of the disclosure is the system as described above, wherein the first and second pairs of axially spaced apart gratings are each formed by holographic gratings.

Another aspect of the disclosure is the system as described above, wherein the first and second relay assemblies each have an adjustable magnification.

Another aspect of the disclosure is the system as described above, wherein the first relay assembly includes a compensating beam splitter or a compensating plate.

Another aspect of the disclosure is the system as described above, further including a beam expander operably arranged between the laser source and the polarizing beam splitter and that is configured to expand the first linearly polarized laser beam.

Another aspect of the disclosure is the system as described above, wherein the beam splitter is a 50:50 beam splitter.

Another aspect of the disclosure is the system as described above, further including: a first camera lens that in combination with the first image sensor defines a first camera, wherein the first image sensor has first pixels; a second camera lens that in combination with the second image sensor defines a second camera, wherein the second image sensor has second pixels; wherein each of the first and second cameras has multi-axis position control to perform surface-to-sensor pixel matching between the surface of sample and the first and second pixels of the first and second image sensors.

Another aspect of the disclosure is the system as described above, further including: a first adjustable aperture operably arranged in the first relay assembly between the first image sensor and the first pair of axially spaced apart gratings, the first adjustable aperture having an adjustable size and an adjustable axial position; and a second adjustable aperture operably arranged in the second relay assembly between the second image sensor and the second pair of axially spaced apart grating, the second adjustable aperture having an adjustable size and an adjustable axial position.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

Cartesian coordinates are shown in some of the Figures for the sake of reference and are not intended to be limiting as to direction or orientation.

Figure 1:
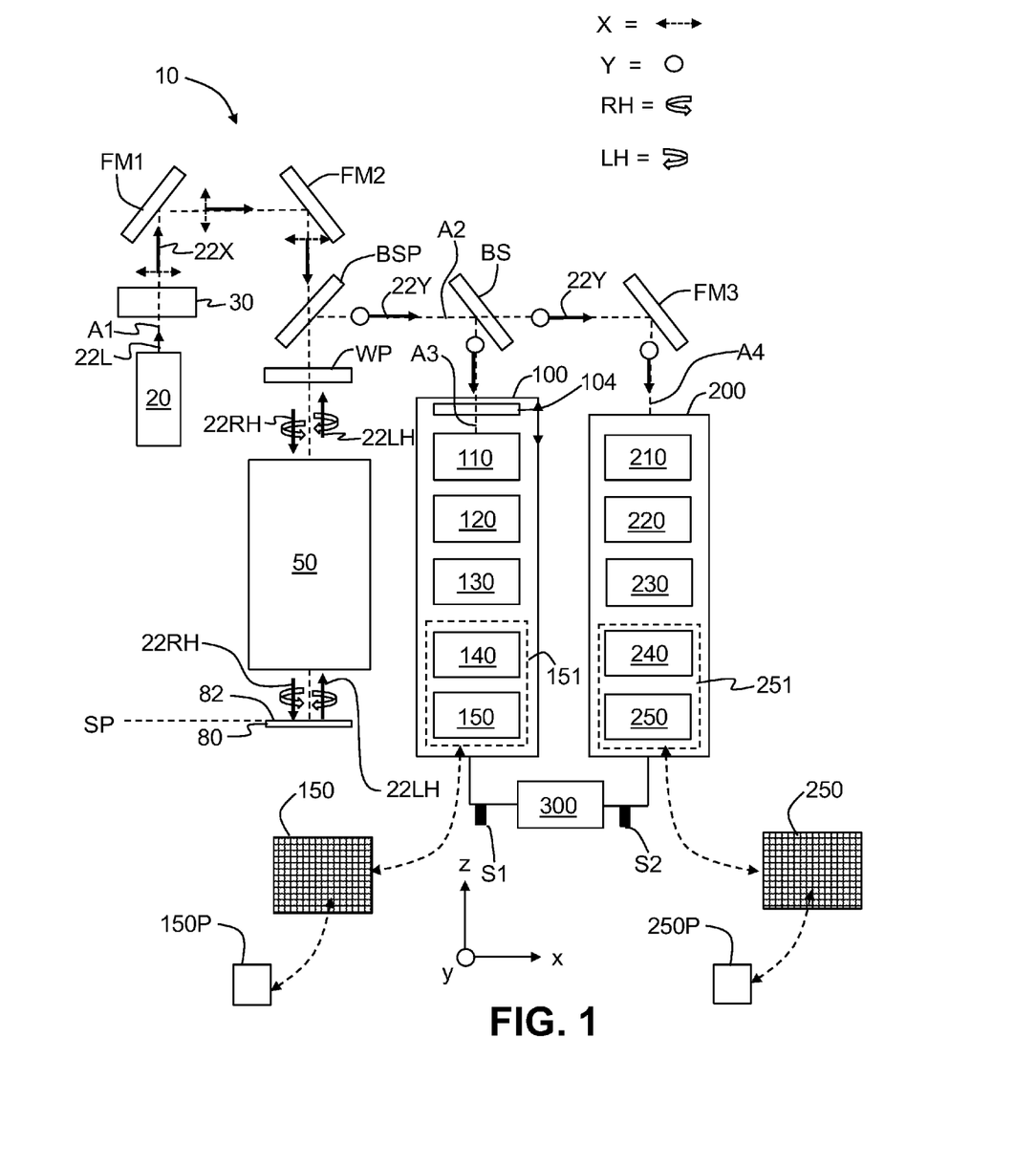
FIG. 1 is a schematic diagram of an example polarization-based CGS system according to the disclosure.

FIG. 1 is a schematic diagram of an example polarization-based CGS system ("system") 10 according to the disclosure. The system 10 includes a laser source 20 that emits along a first optical axis A1 a linearly polarized laser beam 22L, with the dashed-line double arrow indicating an "X" polarization by way of example. The system 10 includes a beam expander 30, two fold mirrors FM1 and FM2 and a polarizing beam splitter BSP, which defines a second optical axis A2. The system 10 also includes along the first optical axis A1 a waveplate WP and a beam expanding optical system 50, which is located adjacent a sample 80 that has a surface 82 with a shape to be measured. In an example, the surface 82 of sample 80 is a specularly reflective surface. Also in an example, the shape can be relatively complex, e.g., beyond a simple parabolic type of curvature. In an example, the system 10 measures at least one shape-based property of the surface 82 of sample 80 being measured, such as the height difference between two locations, slope at one or more locations, and a curvature.

The system 10 also includes along the second optical axis A2 a second beam splitter BS that defines a third optical axis A3 along which resides a first relay assembly 100. A fold mirror FM3 also resides along the second optical axis A2 and defines a fourth optical axis A4 along which resides a second relay assembly 200. The first and second relay assemblies 100 and 200 define first and second interferometer arms and allow for collecting surface-shape information in the x-direction and the y-direction (or more generally, any two directions) simultaneously. This in turn leads to higher measurement throughput and a simplified system wherein the number of moving parts is reduced or eliminated as compared to the single-arm prior art system. Each of the first and second relay assemblies 100 and 200 generates a corresponding data set, and the data sets are used to determine one or more shape-based parameter of the surface 82 of sample 80. Two complete data sets provides redundancy (i.e., the surface shape reconstruction is overdetermined), which allows for improved measurement confidence and error minimization, e.g., by discarding or giving less weight to "bad" pixels.

Figure 2:
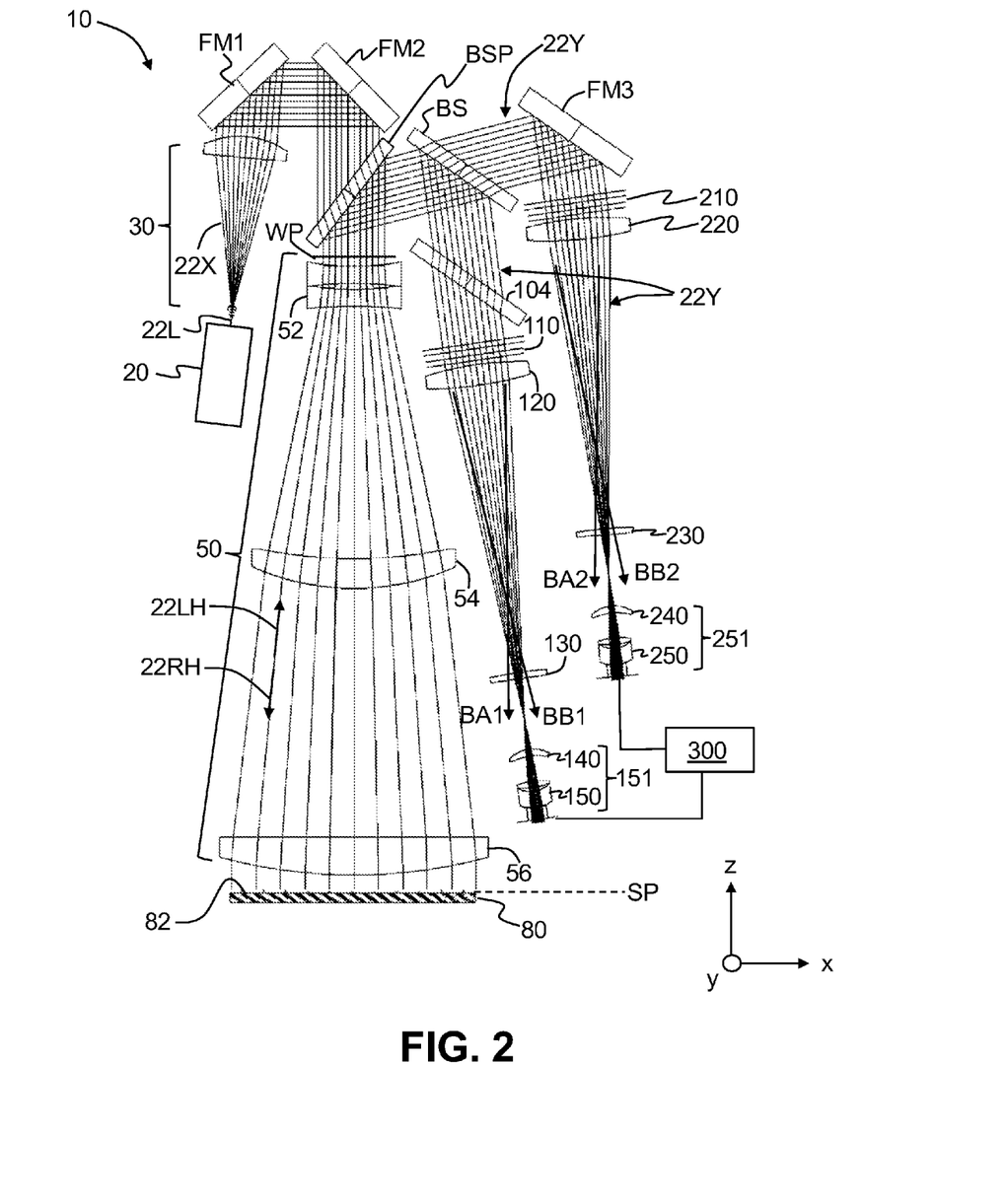
FIG. 2 is an example optical diagram of the polarization-based CGS system of FIG. 1.
Figure 3:
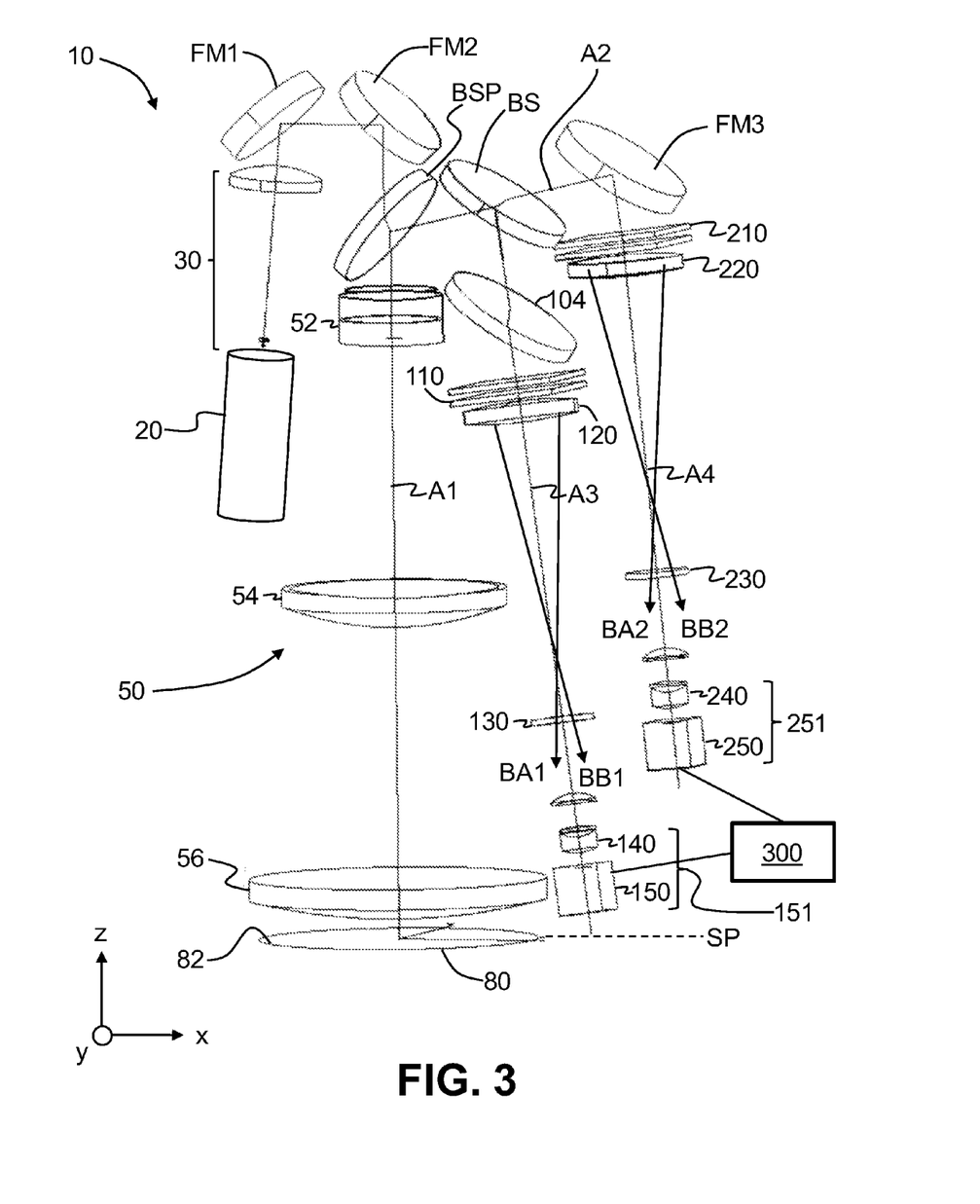
FIG. 3 is a 3D CAD-based view of the polarization-based CGS system of FIG. 2.

FIG. 2 is a more detailed optical diagram of the system 10 of FIG. 1, while FIG. 3 is a 3D CAD-based view of the system 10. An example beam expanding optical system 50 includes, in order along the first optical axis A1, a doublet lens 52, a positive meniscus lens 54 and a plano-convex lens 56. The first relay assembly 100 includes along the third optical axis A3 a compensating plate 104, a first grating pair 110 (shearing distance parallel to x-axis) and a first relay lens system 120, a first Fourier annular aperture plate 130, a first camera lens 140 and a first image sensor 150 that includes first pixels 150P (see leftmost close-up insets in FIG. 1). The first camera lens 140 and first image sensor 150 define a first camera 151.

The second relay assembly 200 includes along the fourth optical axis A4 a second grating pair 210 (shearing distance parallel to y-axis), a second relay lens system 220, a second Fourier aperture plate 230, a second camera lens 240 and a second image sensor 250 that includes second pixels 250P (see rightmost close-up insets in FIG. 1). The second camera lens 240 and second image sensor 250 define a second camera 251.

The first and second image sensors 150 and 250 are electrically connected to a processor 300.

In an example of the operation of system 10, laser source 20 emits a linearly polarized laser beam 22L, which has a relatively small (e.g., 1 mm) initial diameter. The linearly polarized laser beam 22L is received by the beam expander 30, which expands the linearly polarized laser beam by between, for example, 50X and 200X, e.g., to about 80 mm diameter. This expanded polarized beam is denoted 22X to indicate a linear X-polarization. The fold mirrors FM1 and FM2 serve to direct the linearly polarized laser beam 22X through the polarizing beam splitter BSP and to the waveplate WP. The polarizing beam splitter BSP is polarizing and aligned to maximize the intensity of the linearly polarized laser beam 22X to passing through it in transmission, while minimizing the intensity of the unused laser beam reflected off the back surface. The waveplate WP comprises a crystal quartz quarter-wave retardation plate that serves to turn the linearly polarized laser beam 22X to form a circularly polarized laser beam 22RH, e.g., a right-hand polarized laser beam. This circularly polarized laser beam 22RH could also be formed as a left-hand polarized beam.

The right-hand polarized laser beam 22RH enters the beam expanding optical system 50, which is configured to receive and expand the size of right-hand polarized laser beam 22RH. In an example, the amount of beam expansion is 4X, e.g., from an 80 mm diameter beam to a 320 mm diameter beam. The expanded right-hand polarized laser beam 22RH is incident upon the surface 82 of sample 80 as a substantially collimated laser beam. The surface 82 of sample 80 resides in a sample plane SP. Note that the beam expansions are selected based on the size of sample 80. Thus, for a 450 mm diameter wafer, different beam expansion amounts for the beam expander 30 and beam expanding optical system 50 can be used to achieve the right-hand polarized laser beam 22RH having a select size (e.g., select diameter).

The collimated right-hand polarized laser beam 22RH reflects from the surface 82 of sample 80 and reverses its circular polarization to be left-handed, thereby defining a left-hand polarized laser beam 22LH. The left-hand polarized laser beam 22LH acquires a reflected wave-front error equal to twice the 3D-deformation $2 \cdot \Delta Z(x,y)$ of the wafer surface deformation $2X'(x,y)$ & $2Y'(x,y)$ slope distribution. The left-hand polarized laser beam 22LH travels back through the beam expanding optical system 50 and through the waveplate WP, which converts the left-hand polarized laser beam 22LH to have a linear polarization in the Y-direction, i.e., forms a linearly polarized laser beam 22Y. The linearly polarized laser beam 22Y exits the input end of beam expanding optical system 50 as a 4X reduced (e.g., 80 mm diameter beam) with eight-times the wafer surface slope distribution, i.e., $8X'(x,y)$ and $8Y'(x,y)$.

The linearly polarized laser beam 22Y is then steered off the polarizing beam splitter BSP, toward the first and second relay assemblies 100 and 200. The polarizing beam splitter BSP is aligned to maximize the reflected linearly polarized laser beam 22Y incident upon the second beam splitter BS, which is partially transmitting/partially reflecting, e.g., 50:50 beam splitter. Thus, half of the linearly polarized laser beam 22Y is directed to travel down the third optical axis A3 and through the first relay assembly 100 while the other half is directed by the fold mirror FM3 to travel down the second relay assembly 200. Note that the polarizing beam splitter BSP is a polarizing beam splitter that reflects X-polarized and Y-polarized light with nearly 100% efficiency for each polarization. Thus, the only location in the optical path where the laser beam intensity is actually divided is at the second beam splitter BS, so that the first and second relay assemblies 100 and 200 each receive substantially half of the laser beam traveling through system 10, minus the relatively small optical losses that occur due to reflections at the various upstream optical interfaces (e.g., at lens element surfaces in the beam expanding optical system 50, etc.).

The portion of linearly polarized laser beam 22Y that travels through the first relay assembly 100 passes through the compensation plate 104, which compensates for the extra optical path that the linearly polarized laser beam 22Y acquires when passing through the second beam splitter BS to reach the second relay assembly 200. In addition to the compensation plate 104, the first and second relay assemblies 100 and 200 are physically positioned such that the total optical distance between the second beam splitter BS and first and second grating pairs 110 and 210 of the first and second relay assemblies 100 and 200 is identical. The linearly polarized laser beam 22Y passes through the compensation plate 104 and then reaches the first grating pair 110. In an example, the first grating pair 110 comprises a pair of variably spaced and parallel Ronchi or diffraction gratings. The linearly polarized laser beam 22Y is diffracted by the first grating pair 110 into several orders: $0^{th}$; $\pm 1^{st}$; $\pm 2^{nd}$; at different relative intensities.

Exiting from the grating pair 110 there are two beam components of interest: the $0^{th}$ and $+1^{st}$ order components from the first grating pair 110 and $+1^{st}$ and $0^{th}$ order from the second grating pair 210. It should be noted that different combinations of diffraction orders from the two gratings in the grating pair 110 and 210 can be combined to generate interference; in practice, the use of lower diffraction orders is most desirable. These two beam components are laterally sheared in the "X-direction" (left-right on the plane of view) by an amount proportional to grating spatial frequency and the axial separation (Z-distance) between the first grating pair 110. These and other "pairs" of diffracted beam components enter a first relay lens system 120 and are focused in the vicinity of first Fourier annular aperture plate 130. The first relay lens system 120 and first Fourier annular aperture plate 130 define an optic axis that is aligned parallel to the diffraction angle of desired diffraction orders. The size of central hole (i.e., the clear aperture) of the first Fourier annular aperture plate 130 is adjustable and is selected to block all unwanted pairs of diffracted beam components so only a desired pair of sheared $1^{st}$ order beam components BA1 and BB1 from tandem pair of gratings is transmitted.

The optimal z-position and size (clear aperture) of the first Fourier annular aperture plate 130 may vary depending on the overall shape of the surface 82 of sample 80. For a perfectly flat object, the desired diffraction order will be at minimum diameter and maximum separation from the unwanted orders at the Fourier plane of the first relay lens system 120. For nominally convex (curved down) objects, the plane of minimum diameter will shift closer to the first camera 151, whereas for nominally concave objects (curved up) the plane of minimum diameter will shift closer to the sample 80 relative to the Fourier plane. Automated adjustment of the aperture axial position and diameter maximizes the range of object shapes that can be measured with the system 10.

The sheared diffracted beam components BA1 and BB1 are focused by the first camera lens 140 to pixelated (digital) first image sensor 150 (CCD, CMOS, etc.), where each beam component interferes with its counterpart to produce a spatial intensity distribution (interference fringes) on the first image sensor 150. The first relay lens system 120 and first camera lens 140 are configured such that the sample plane SP is conjugate to the first image sensor 150 but de-magnified by approximately 20X, e.g., with a beam diameter of about 15 mm. More generally, the demagnification is selected to maximize the size of the image on the first image sensor 150. In practice the demagnifications of 10X to 40X are typical. Each bright and dark fringe is the locus of points corresponding to eight-times the slope of the wafer in the X-direction of shear such that the bright fringe corresponds to the sheared diffracted beam components BA1 and BB1 of equal phase $N*\pi*\lambda$ (i.e., constructive interference) and each dark fringe corresponds to components of equal phase $N*\pi*\lambda/2$ (i.e., destructive interference).

Likewise, the portion of linearly polarized laser beam 22Y that passes through the second relay assembly 200 passes through the second grating pair 210, which in an example are variably spaced and parallel Ronchi or diffraction gratings. The gratings are rotated about the local optic axis A3 by 90° so as to be orthogonal to the first grating pair 110 in the first relay assembly 100. The linearly polarized laser beam 22Y traveling in the second relay assembly 200 diffracts into several orders: $0^{th}$; $\pm 1^{st}$; $\pm 2^{nd}$; etc. Exiting from the first and second grating pairs 110 and 210 there are two beam components of interest: $0^{th}$ and $1^{st}$ order from the first grating and $+1^{st}$ and $0^{th}$ order from the second grating. These two beam components are now laterally sheared in the "Y-direction" (in-out of the plane of view) by an amount proportional to grating spatial frequency and the axial separation (Z-distance) between the second grating pair 210. These and other "pairs" of diffracted beam components BA2 and BB2 enter a second relay lens system 220 and are focused in the vicinity of second Fourier annular aperture plate 230.

The size and position of second Fourier annular aperture plate 230 are adjustable so that it can be configured to block all unwanted pairs of diffracted beam components so only a desired pair of sheared diffracted beam components BA2 and BB2 of sheared 1$^{st}$ order beam components from the tandem grating pair 210 is transmitted. It is noted that the 0, −1 and −1, 0 diffraction orders can also be used, and in general any odd order can be used.

As with the first Fourier annular aperture plate 130, the optimal z-position and size (clear aperture) of the second Fourier annular aperture plate 230 may vary depending on the overall shape of the surface 82 of sample 80.

The sheared diffracted beam components BA2 and BB2 are also focused by a second camera lens 240 to a pixelated (digital) second image sensor 250 (CCD, CMOS, etc.), where each of the sheared diffracted beam component BA2, BB2 interferes with its counterpart to produce a spatial intensity distribution (interference fringes) on the second image sensor 250. The second relay lens system 220 and the second camera lens 240 are configured such that the sample plane SP is conjugate to the second image sensor 250 but de-magnified approximately 20X so that in an example the sheared diffracted component beam BA2, BB2 has a diameter of about 15 mm. As noted above in connection with the first relay assembly 100, the demagnification is selected to maximize the size of the image on the second image sensor 250. It is also noted that minor adjustments to the separation of the gratings that make up the first and second grating pairs 110 and 210 can be performed to match the shearing distance of the two relay assemblies 100 and 200.

Each bright and dark fringe is the locus of points corresponding to eight-times the slope of the wafer in the Y-direction of shear such that the bright fringe corresponds to sheared beam components of equal phase $N*\pi*\lambda$ (i.e., constructive interference) and each dark fringe corresponds to components of equal phase $N*\pi*\lambda/2$ (i.e., destructive interference).

In an example, each of the first and second relay assemblies 100 and 200 is configured to allow their performance to be matched with respect to shearing distance and object-to-sensor magnification. Thus, for example, first and second grating pairs 110 and 210 can be made axial adjustable parallel to the z-axis, which allows control of the shearing distance associated with each grating pair 110, 210 with the grating separation proportional to the shearing distance. Further, in an example, each of first and second relay assemblies 100 and 200 includes magnification adjustment that allows for fine-control of the object-to-sensor magnification. Here, "fine control" means that the resolution of the lens position control is large as compared to what can be resolved with respect to a feature in the image of object surface 82 (e.g., 1 pixel).

In an example, the cameras 151 and 251 are configured with multi-axis position control that enables surface-to-sensor pixel matching, i.e., matching a mapping of a position on the object surface 82 to same positions of first and second pixels 150P and 250P on the first and second image sensors 150 and 250, respectively. In an example, the magnification adjustment in the first and second relay assemblies 100 and 200 is provided by at least one movable element in each of first and second relay lens systems 120 and 220 or in each of the first and second camera lens 140 and 240.

The first and second image sensors 150 and 250 respectively generate first and second sensor signals S1 and S2 that are sent to and processed by a processor 300 to determine one or more shape-based properties of the surface 82 of sample 80.

The use of polarizing optics in system 10 reduces the amount of optical loss by 4X as compared to using non-polarizing optics. This results in a stronger sensor signals S1 and S2, which in turn results in a better sample surface measurement (e.g., less noise), and higher measurement resolution, which depends on the number of photons per pixel in a digital image sensor. The configuration of system 10 also allows for reduction of other adverse optical effects, such as stray light, and also allows for balancing the intensity in the interfering beam components (BA1, BB1 and BA2, BB2). The improved laser beam throughput also allows for the use of the center and relatively flat (i.e., uniform) part of the Gaussian beam 22X from the laser source 20 to improve beam uniformity, while discarding the tails of the beam. In this way, illumination uniformity can be improved while not substantially adversely affecting the intensity needed to perform surface shape measurements. Further, maximizing the available intensity in the system 10 allows for shorter exposure times at the first and second image sensors 150 and 250, which reduces blurring due to vibrations (e.g., sample vibrations). The higher optical transmission of the two-armed system 10 also allows for lower-power and thus more stable lasers for the laser source 20.

In an example, the grating pairs 110 and 210 can comprise binary-optics, ruled or holographic-based whereby the energy ratios in the zero and +1 orders can be designed to have balanced relative intensities such that unwanted odd and even diffraction order intensities could be minimized to prevent/minimize ghost-beam diffraction/interference-fringes and improves fringe contrast, which provides a higher signal-to-noise ratio. This in lieu of less efficient black-bar/open-space Ronchi gratings, where 50% of incident laser beam is "blocked" (absorbed) by the bars of each grating. Otherwise, <25% transmission results for each pair of Ronchi gratings. Diffractive Phase Gratings can be 100% efficient (in the limit) for each diffracted order, depending on how they are designed using binary-optics or computer generated (thick-film) holographic (CGH) or ruled/blazed grating groove geometries; all of which can be replicated by low-cost methods once "masters" are created. The replication process for holographic gratings is much more uniform across the in-plane dimensions of the grating and repeatable from grating-to-grating as compared to bar-space types of grating. For example, holographic gratings do not have issues with run-out or grating-to-grating magnification. So for gratings that have an effective pitch of 12.7 microns (nominally), the holographic gratings are consistent on the order of <10 nm whereas bar-space gratings vary on the order of 50 to 100 nm.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

What is claimed is:

1. A method of measuring at least one shape-based property of a specularly reflective surface, comprising:
directing a collimated laser beam having a first circular polarization to a sample surface;
reflecting the collimated laser beam from the sample surface to form a reflected laser beam having a second circular polarization and that includes shape information of the specularly reflective surface;

converting the reflected laser beam having the second circular polarization to a linearly polarized reflected laser beam;

directing a first portion of the linearly polarized reflected laser beam to a first pair of axially spaced apart gratings having a first orientation and forming two first diffraction components, and combining the two first diffraction components to form a first interference pattern on a first image sensor;

directing a second portion of the linearly polarized reflected laser beam to a second pair of axially spaced apart gratings having a second orientation orthogonal to the first orientation and forming two second diffraction components and combining the two second diffraction components to form a second interference pattern on a second image sensor; and processing the first and second interference patterns to determine the at least one shape-based property of the specularly reflective surface.

2. The method according to claim 1, wherein directing the first and second portions of the linearly polarized reflected laser beam includes using a beam splitter to send the first and second portions of the linearly polarized reflected laser beam to respective first and second relay assemblies.

3. The method according to claim 1, wherein the first and second portions of the linearly polarized reflected laser beam have substantially the same intensity.

4. The method according to claim 1, wherein directing the collimated laser beam includes generating an initial laser beam from a laser source and passing the initial laser beam through a first beam expander to form a first expanded laser beam and then through a beam expanding optical system to form a second expanded laser beam.

5. The method according to claim 4, wherein the initial laser beam and the first expanded laser beam are linearly polarized and including passing the first expanded laser beam through a quarter-wave retardation plate to form a circularly polarized collimated laser beam.

6. The method according to claim 5, wherein converting the reflected laser beam having the second circular polarization to the linearly polarized reflected laser beam includes passing the reflected laser beam through the quarter-wave retardation plate.

7. The method according to claim 1, wherein combining the two first diffraction components includes passing the two first diffraction components through a first Fourier aperture using a first relay lens system, and wherein combining the two second diffraction components includes passing the two second diffraction components through a second Fourier aperture using a second relay lens system.

8. The method according to claim 1, wherein the collimated laser beam having a first circular polarization has a diameter of between 300 mm and 450 mm.

9. The method according to claim 1, wherein the collimated laser beam is formed from an initial laser beam emitted by a helium-neon laser.

10. The method according to claim 1, wherein the first and the second pairs of axially spaced apart gratings each consist of phase gratings.

11. The method according to claim 1, further comprising controlling a first magnification of the first portion of the linearly polarized reflected laser beam and controlling a second magnification of the second portion of the linearly polarized reflected laser beam so that the first interference pattern formed on the first image sensor has a same size as the second interference pattern formed on the second image sensor.

12. The method according to claim 1, where the first image sensor has first pixels and is combined with a first camera lens to form a first camera, wherein the second image sensor has second pixels and is combined with a second camera lens to form a second camera, and wherein each of the first and second cameras has multi-axis position control to perform surface-to-sensor pixel matching between the sample surface and the first and second pixels of the first and second image sensors.

13. The method according to claim 1, wherein the at least one shape-based property includes a height difference between two locations on the sample surface, a slope and a curvature.

14. The method according to claim 1, further comprising:

directing the two first diffraction components through a first adjustable aperture having an adjustable size and adjustable axial position;

directing the two second diffraction components through a second adjustable aperture having an adjustable size and adjustable axial position; and adjusting at least one of the size and axial position of the first and second adjustable apertures to block diffraction orders other than two first diffraction orders and two second diffraction orders, respectively.

15. A system for measuring at least one shape-based property of a sample having a surface that is specularly reflective, comprising:

a laser source that emits a first linearly polarized laser beam;

a polarizing beam splitter arranged to transmit the first linearly polarized laser beam;

a waveplate arranged to transmit the first linearly polarized laser beam transmitted by the polarizing beam splitter to form a first circularly polarized laser beam;

a beam expanding optical system that receives and directs the first circularly polarized laser beam to the surface of sample to form a reflected laser beam having a second circular polarization and that includes shape information about the surface of sample, wherein the reflected laser beam exits the beam expanding optical system, passes through the waveplate and that reflects from the polarizing beam splitter to form a second linearly polarized laser beam;

a beam splitter arranged to pass and reflect respective first and second portions of the second linearly polarized laser beam;

a first relay assembly arranged to receive and direct the first portion of the second linearly polarized laser beam to a first pair of axially spaced apart gratings having a first orientation and that form two first diffraction components, wherein the two first diffraction components are combined to form a first interference pattern on a first image sensor;

a second relay assembly arranged to receive and direct the second portion of the second linearly polarized laser beam to a second pair of axially spaced apart gratings having a second orientation to form two second diffraction components, wherein the two second diffraction components are combined to form a second interference pattern on a second image sensor; and a processor configured to process the first and second interference patterns to determine the at least one shape-based property of the sample having the surface that is specularly reflective.

16. The system according to claim 15, wherein the at least one shape-based property includes a height difference between two locations on the surface of sample, a slope and a curvature.

17. The system according to claim 15, wherein the surface of sample has a diameter and wherein the beam-expanding optical system is configured to expand the first circularly polarized laser beam to have a diameter equal to or greater than the diameter of the surface of sample.

18. The system according to claim 15, wherein the first and second pairs of axially spaced apart gratings are each formed by holographic gratings.

19. The system according to claim 15, wherein the first and second relay assemblies each have an adjustable magnification.

20. The system according to claim 15, wherein the first relay assembly includes a compensating plate.

21. The system according to claim 15, further comprising a beam expander operably arranged between the laser source and the polarizing beam splitter and that is configured to expand the first linearly polarized laser beam.

22. The system according to claim 15, wherein the beam splitter is a 50:50 beam splitter.

23. The system according to claim 15, further comprising:
a first camera lens that in combination with the first image sensor defines a first camera, wherein the first image sensor has first pixels;
a second camera lens that in combination with the second image sensor defines a second camera, wherein the second image sensor has second pixels;
wherein each of the first and second cameras has multi-axis position control to perform surface-to-sensor pixel matching between the surface of sample and the first and second pixels of the first and second image sensors.

24. The system according to claim 15, further comprising:
a first adjustable aperture operably arranged in the first relay assembly between the first image sensor and the first pair of axially spaced apart gratings, the first adjustable aperture having an adjustable size and an adjustable axial position; and
a second adjustable aperture operably arranged in the second relay assembly between the second image sensor and the second pair of axially spaced apart grating, the second adjustable aperture having an adjustable size and an adjustable axial position.

* * * * *